United States Patent [19]
Sato

[11] Patent Number: 5,274,792
[45] Date of Patent: Dec. 28, 1993

[54] INFORMATION PROCESSING APPARATUS WITH PARALLEL INSTRUCTION DECODING

[75] Inventor: Taizo Sato, Kawasaki, Japan

[73] Assignee: Fujitsu Limited, Kawasaki, Japan

[21] Appl. No.: 7,032

[22] Filed: Jan. 21, 1993

Related U.S. Application Data

[63] Continuation of Ser. No. 568,864, Aug. 17, 1990, abandoned.

[30] Foreign Application Priority Data

Aug. 19, 1989 [JP] Japan ................... 1-213944

[51] Int. Cl.⁵ .................. G06F 9/34; G06F 9/22; G06F 12/00
[52] U.S. Cl. .................. 395/425; 395/375; 364/DIG. 1
[58] Field of Search .............. 395/425, 375; 364/231.8, DIG. 1 MS File

[56] References Cited

U.S. PATENT DOCUMENTS

| | | | |
|---|---|---|---|
| 5,136,696 | 8/1992 | Beckwith et al. | 395/375 |
| 5,148,528 | 9/1992 | Fite et al. | 395/375 |
| 5,179,530 | 1/1993 | Genusov et al. | 364/726 |

Primary Examiner—Alyssa H. Bowler
Attorney, Agent, or Firm—Staas & Halsey

[57] ABSTRACT

An information processing apparatus includes a decoder for decoding an instruction, a general purpose register part including a stack pointer and a plurality of general purpose registers, a special purpose register part including a plurality of special purpose registers, and a processing part coupled to the decoder, the general purpose register part and the special purpose register part for carrying out a predetermined process based on a decoded result from the decoder by selectively using a read out result of one of the general purpose register part and the special purpose register part. A decoding operation of the decoder, a read out operation of the general purpose register part and a read out operation of the special purpose register part are carried out in parallel.

13 Claims, 15 Drawing Sheets

INFORMATION PROCESSING APPARATUS WITH PARALLEL INSTRUCTION DECODING

This application is a continuation of application Ser. No. 07/568,864, filed Aug. 17, 1990, now abandoned.

BACKGROUND OF THE INVENTION

The present invention generally relates to information processing apparatuses, and more particularly to an information processing apparatus for processing digital data at a high data processing speed and suited for application on a general purpose microprocessor.

In the recent general purpose microprocessor, the operation frequency is high and a processing such as the pipeline processing is carried out to satisfy the demands for high-speed data processing.

According to the pipeline processing, before one operation ends a next operation is started when repeating similar processes. Hence, a plurality of operations are executed in an overlapping manner so as to realize a high-speed processing by hardware. For example, the pipeline processing of the microprocessor is made up of five stages which are an instruction decode stage, an effective address calculation stage, an operand read stage, an operand process execution stage and an operand write stage. In this case, the read out from the register and the decoding of the instruction must be carried out in the instruction decode stage in order to enter the effective address calculation stage. Hence, in order to realize the high-speed data processing, the instruction decode stage must be carried out at a high speed, that is, the read out from the register and the decoding of the instruction must be carried out at a high speed.

FIG. 1 shows an example of a conventional information processing apparatus. An information processing apparatus 50 shown in FIG. 1 includes an instruction register 51 for storing an instruction, a bus 58 for transferring the instruction, an instruction decoder 52 for decoding the transferred instruction, a register specifier part 53 for specifying a register depending on a decoded result from the instruction decoder 52, a general purpose register part 54 including a stack pointer and a plurality of general purpose registers, a special purpose register part 55 including a plurality of special purpose registers, an address calculation part 56 for calculating an effective address from the decoded result and a read out register content, and a memory 57 to which an access is made based on a calculation result.

When the instruction is stored in the instruction register 51, the information processing apparatus 50 transfers an instruction code within the instruction to the instruction decoder 52 via the bus 58. The instruction decoder 52 decodes the instruction code and supplies a decoded result to the register specifier part 53. The register specifier part 53 specifies a read operation from the general purpose register part 54 or the special purpose register part 55. Based on the register content read out from the general purpose register part 54 or the special purpose register part 55, the address calculation part 56 calculates the effective address and makes access to the memory 57 at this effective address. Thereafter, the information processing apparatus 50 carries out various processes based on the contents of the memory 57 and the like.

When the stack pointer is specified by the general purpose register part 54, the stack pointer may be read out as the stack pointer itself and the stack pointer may be read out as the general purpose register depending on the decoded result. For this reason, an access to the register can only be made after the decoding of the instruction. Therefore, there is a problem in that the speed of the decoding stage cannot be reduced considerably, and it is thus difficult to set the operation frequency high.

SUMMARY OF THE INVENTION

Accordingly, it is a general object of the present invention to provide a novel and useful information processing apparatus in which the problems described above are eliminated.

Another and more specific object of the present invention is to provide an information processing apparatus comprising a decoder for decoding an instruction, a general purpose register part including a stack pointer and a plurality of general purpose registers, a special purpose register part including a plurality of special purpose registers, and processing means coupled to the decoder, the general purpose register part and the special purpose register part for carrying out a predetermined process based on a decoded result from the decoder by selectively using a read out result of one of the general purpose register part and the special purpose register part. A decoding operation of the decoder, a read out operation of the general purpose register part and a read out operation of the special purpose register part are carried out in parallel. According to the information processing apparatus of the present invention, it is possible to increase the processing speed of the instruction decode stage of the pipeline processing and to increase the processing speed of the effective address calculation stage which follows. Therefore, the processing speed of the information processing apparatus is greatly increased.

Other objects and further features of the present invention will be apparent from the following detailed description when read in conjunction with the accompanying drawings.

DESCRIPTION OF THE PREFERRED EMBODIMENTS

Figure 1:
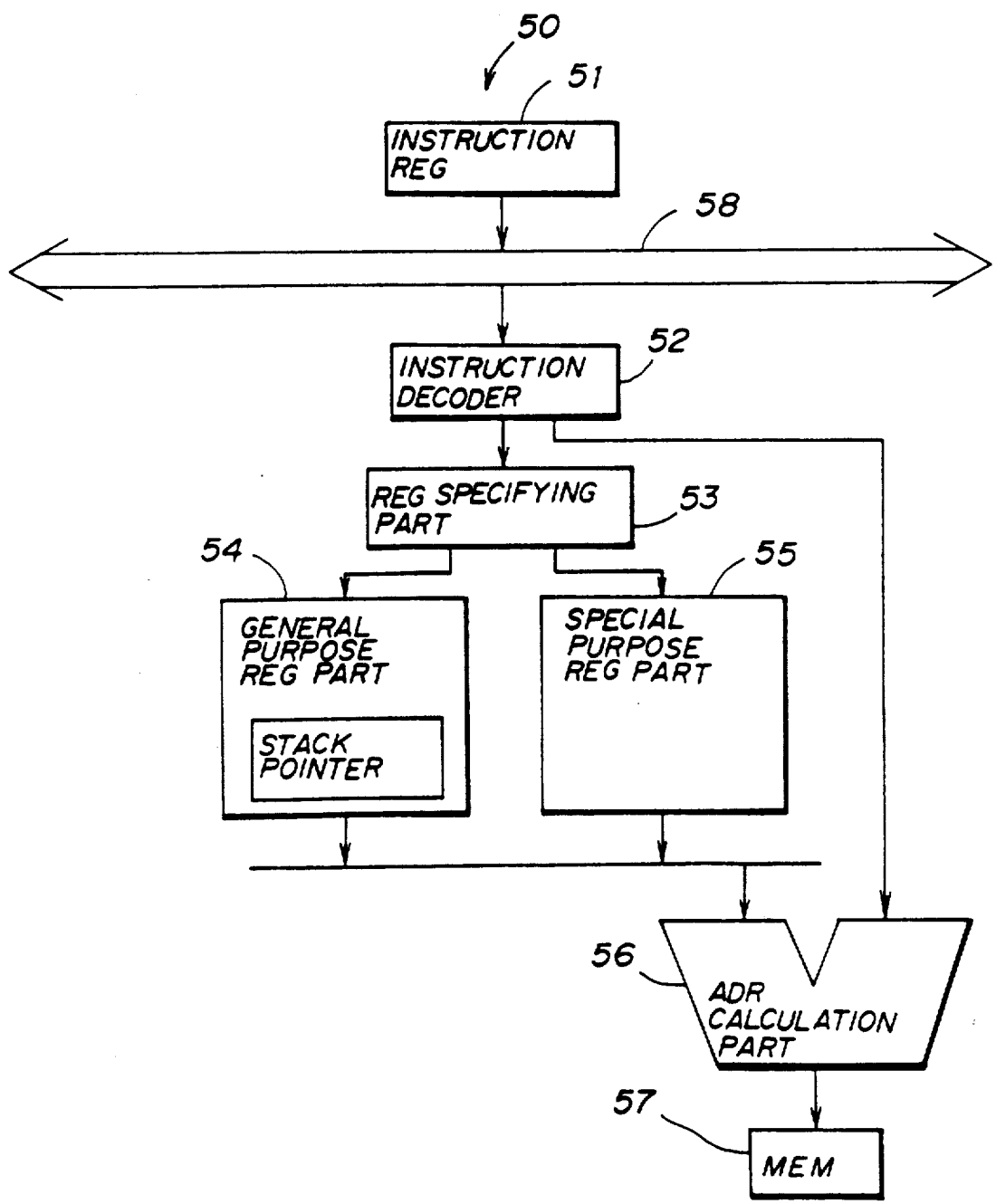
FIG. 1 is a system block diagram showing an example of a conventional information processing apparatus.

First, a description will be given of a first embodiment of an information processing apparatus according to the present invention, by referring to FIG. 2.

An information processing apparatus 1 shown in FIG. 2 includes an instruction register 2 for temporarily storing an instruction, an instruction decoder 3 for decoding an instruction code within the instruction and for outputting a register specifying signal 11 which selects a general purpose register or a special purpose register which will be described later, a general purpose register part 4 including a stack pointer and a plurality of general purpose registers, a special purpose register part 5 including a plurality of special purpose registers, an address calculation part 6 for calculating an address from a result of the decoded instruction and a register content, a memory to which an access is made based on the address calculated in the address calculation part 6, and a bus part 8 for transmitting and receiving data.

For example, the information processing apparatus 1 is made of a monolithic microprocessor which is formed on a single semiconductor body.

Figure 3:
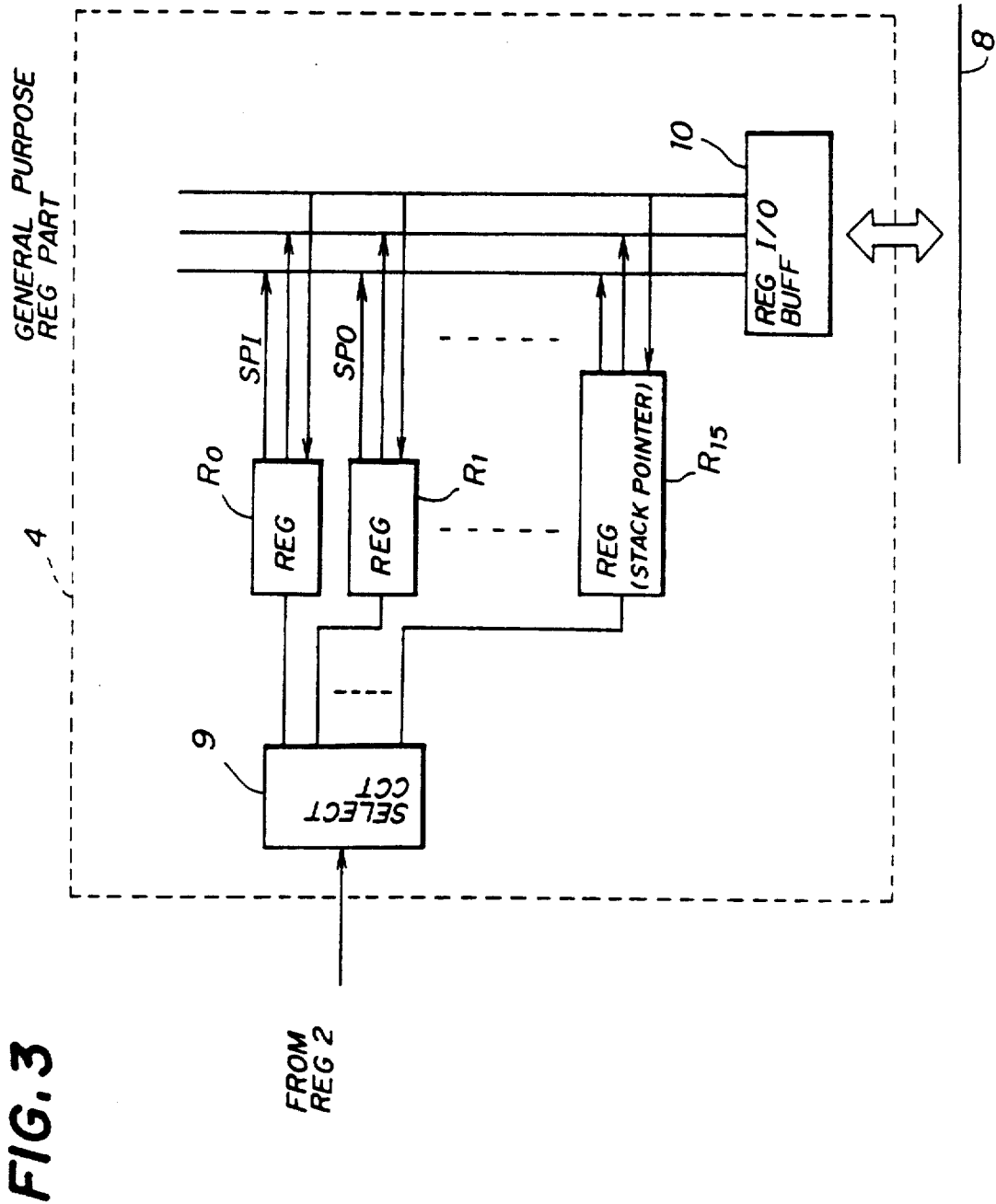
FIG. 3 is a system block diagram showing an embodiment of a general purpose register part shown in FIG. 2.

As shown in FIG. 3, the general purpose register part 4 includes sixteen registers R0 through R15 for storing various data, a general purpose register selection circuit 9 for selecting a predetermined one of the registers R0 through R15, and a register input/output buffer 10 for temporarily storing the data when inputting/outputting data. For the sake of convenience, it is assumed that the register R15 of the general purpose register part 4 is used as the stack pointer.

The special purpose register part 5 has a structure similar to that of the general purpose register part 4, and illustration and description thereof will be omitted.

Figure 4:
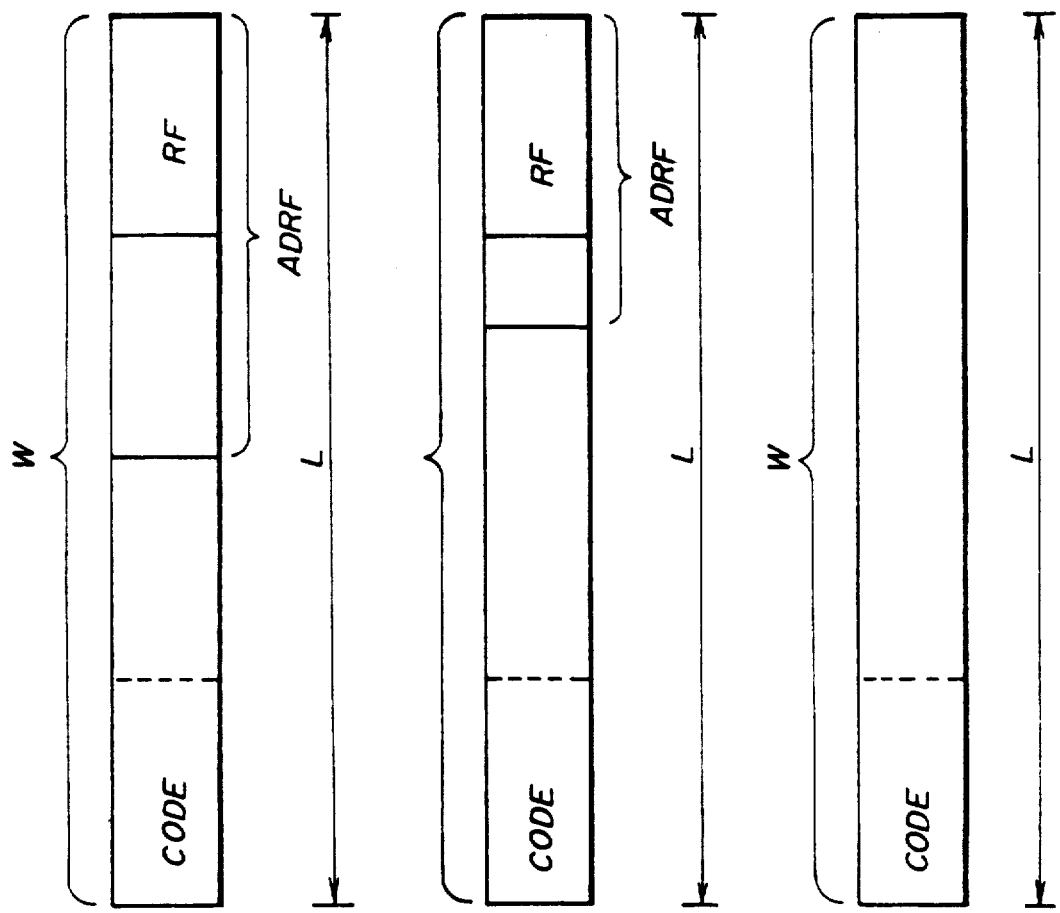
FIGS. 4A through 4C are diagrams for explaining instruction formats.

FIGS. 4A through 4C show instruction formats which may be employed in this embodiment. FIGS. 4A and 4B show instruction formats having an effective address field ADRF within an instruction W for specifying an effective address. A register field RF for specifying a register is provided within the effective address field ADRF. On the other hand, FIG. 4C shows an instruction format having no effective address field ADRF. In each of the instruction formats shown in FIGS. 4A through 4C, the instruction length is L.

When the instruction W is stored in the instruction register 2, the instruction decoder 3 decodes an instruction code CODE within the instruction W. At the same time, the information processing apparatus 1 specifies a general purpose register number based on the contents of the register field RF within the instruction W in the cases shown in FIGS. 4A and 4B or based on the contents at a location where a register field should exist within the instruction W when no register field RF exists as shown in FIG. 4C. The general purpose register number is used to make access to a general purpose register which is specified by the general purpose register number. In addition, an access is simultaneously made to a special purpose register depending on the running state.

Thereafter, the instruction decoder 3 outputs the register specifying signal 11 based on the decoded result of the instruction code CODE. Based on this register specifying signal 11, a result of the access to the general purpose register part 4 or a result of the access to the special purpose register part 5 is transferred to the address calculation part 6 via the bus part 8. The address calculation part 6 calculates an actual address in the memory 7 based on the decoded result of the instruction code CODE and the result of the access to the general purpose register part 4 or the result of the access to the special purpose register part 5. The information processing apparatus 1 carries out a processing based on the actual address calculated in the address calculation part 6.

Figure 5:
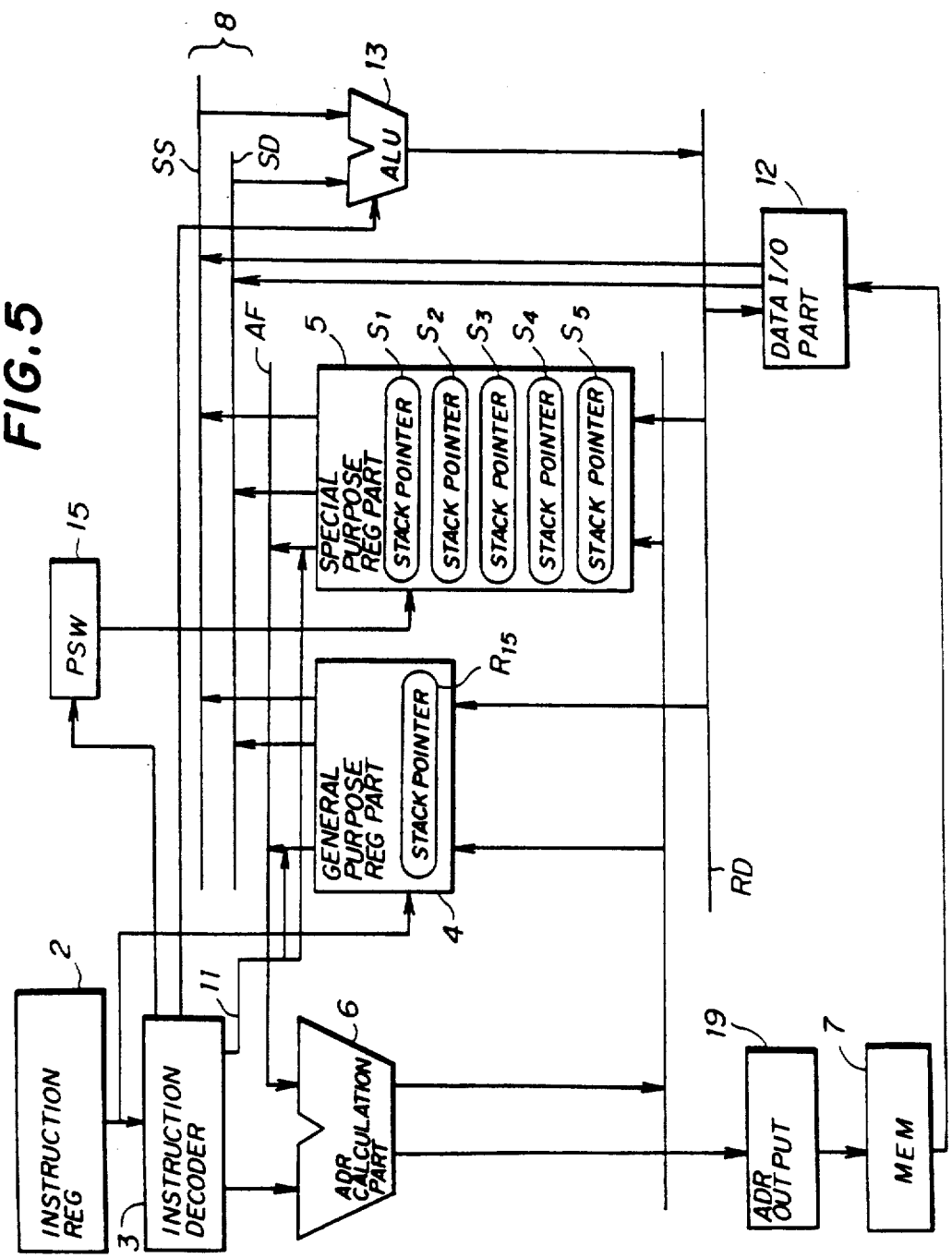
FIG. 5 is a system block diagram showing an essential part of a second embodiment of the information processing apparatus according to the present invention.

Next, a description will be given of a second embodiment of the information processing apparatus according to the present invention, by referring to FIG. 5. In this embodiment, the present invention is applied to an information processing apparatus having TRON (The Realtime Operating System Nucleus) specifications. In FIG. 5, those parts which are essentially the same as those corresponding parts in FIG. 2 are designated by the same reference numerals, and a description thereof will be omitted.

This second embodiment differs from the first embodiment described above in that this second embodiment includes five stack pointers S1 through S5 in the special purpose register part 5 and a data input/output part 12, an arithmetic logic unit (ALU) 13, a processor status word register 15 and an address output part 19 are further provided. The data input/output part 12 carries out an interface operation with respect to the input/output data, and the ALU 13 carries out the actual operation process. The processor status word stored in the processor status word register 15 is supplied to the special purpose register part 5 responsive to the instruction decoder 3. The address output part 19 supplies the address from the address calculation part 6 to the memory 7.

According to the TRON specification, a ring protection method is employed in order to prevent destruction of a system region due to a bug in the program. The ring protection method takes measures so that a region (including program region, data region and work region) to which an access can be made differs depending on the ring level. There are four ring levels which are "0" to "3". The ring level "0" is the highest ring level, and the region to which an access can be made becomes larger as the ring level becomes higher. For example, an access can be made to all of the region when the ring level is "0". For this reason, the stack pointers S1 through S4 for making access are respectively provided in correspondence with the four ring levels. When making a transition between two ring levels, the stack pointer is switched so that the program having a low ring level will not rewrite the region of the program having a high ring level. In order to make access to the stack pointer, a judgement must first be made to determine the ring level which is presently running. The remaining stack pointer S5 is used as a stack pointer for interrupt processing.

In the information processing apparatus having the TRON specifications, only the stack pointer corresponding to the presently running ring level becomes effective, and an access can only be made to this effective stack pointer in this ring level. For this reason, when a write instruction signal is supplied to the accessible stack pointer of the special purpose register part 5, the same content may be written into the stack pointer R15 of the general purpose register part 4 so as to eliminate the need to distinguish the accessible stack pointer of the special purpose register part 5 by reading out the content of the stack pointer R15 of the general purpose register part 4. As a result, it is possible to improve the processing speed compared to the case where an access is made by specifying the stack pointer of the special purpose register part 5 corresponding to the concerned ring level. When a transition is made from a first ring level to a second ring level, the content of the stack pointer of the special purpose register part 5 corresponding to the second ring level is written in the stack pointer R15 of the general purpose register part 4.

Therefore, the register content which is read out is transferred to the address calculation part 6 together with the result of the decoded instruction, and the effective address of the memory 7 is calculated in the address calculation part 6. Thereafter, the data within the memory 7 at the calculated effective address is transferred to the ALU 13 via the data input/output part 12 and processed in the ALU 13.

Figure 2:
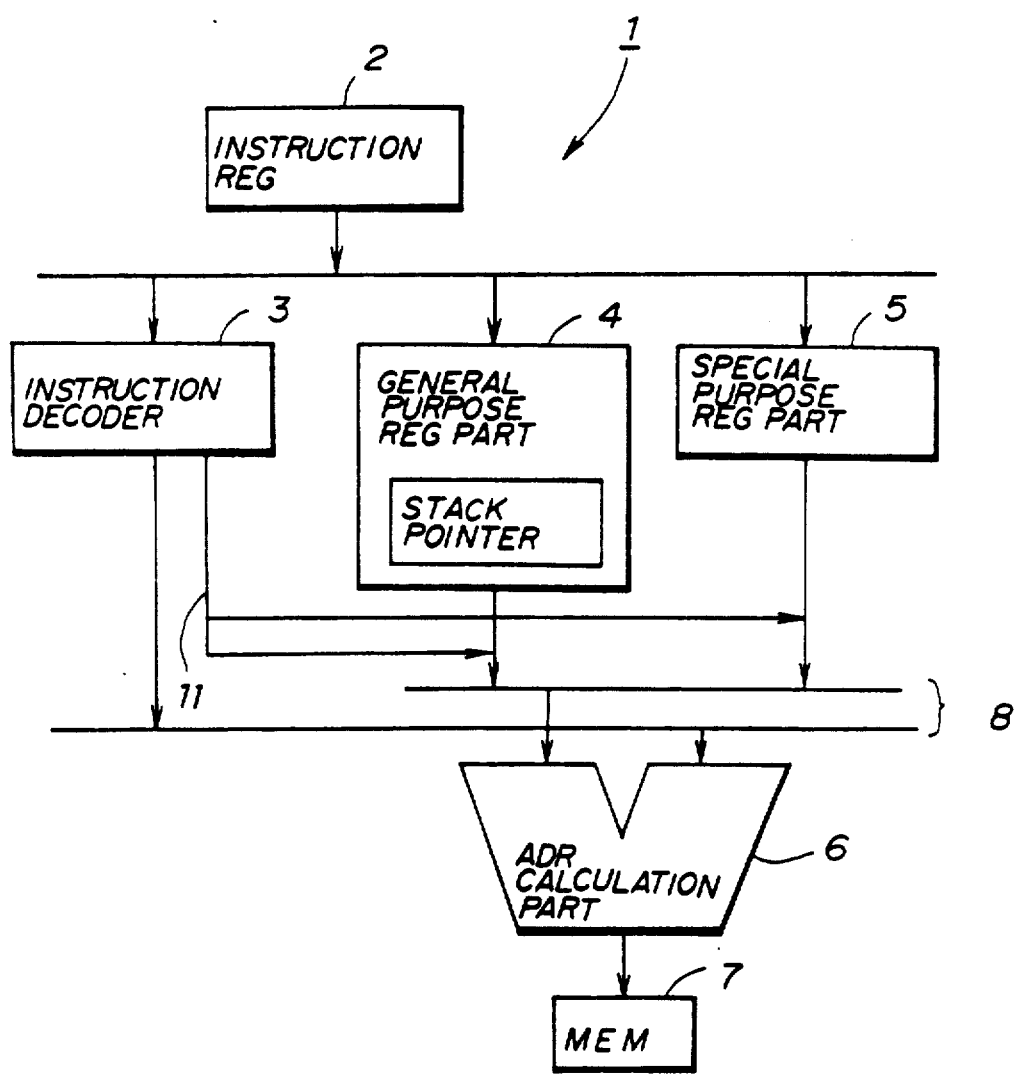
FIG. 2 is a system block diagram showing essential part of a first embodiment of an information processing apparatus according to the present invention.

Other operations of the second embodiment are basically the same as those of the first embodiment described in conjunction with FIG. 2. For example, the information processing apparatus is made of a monolithic microprocessor which is formed on a single semiconductor body.

Figure 6:
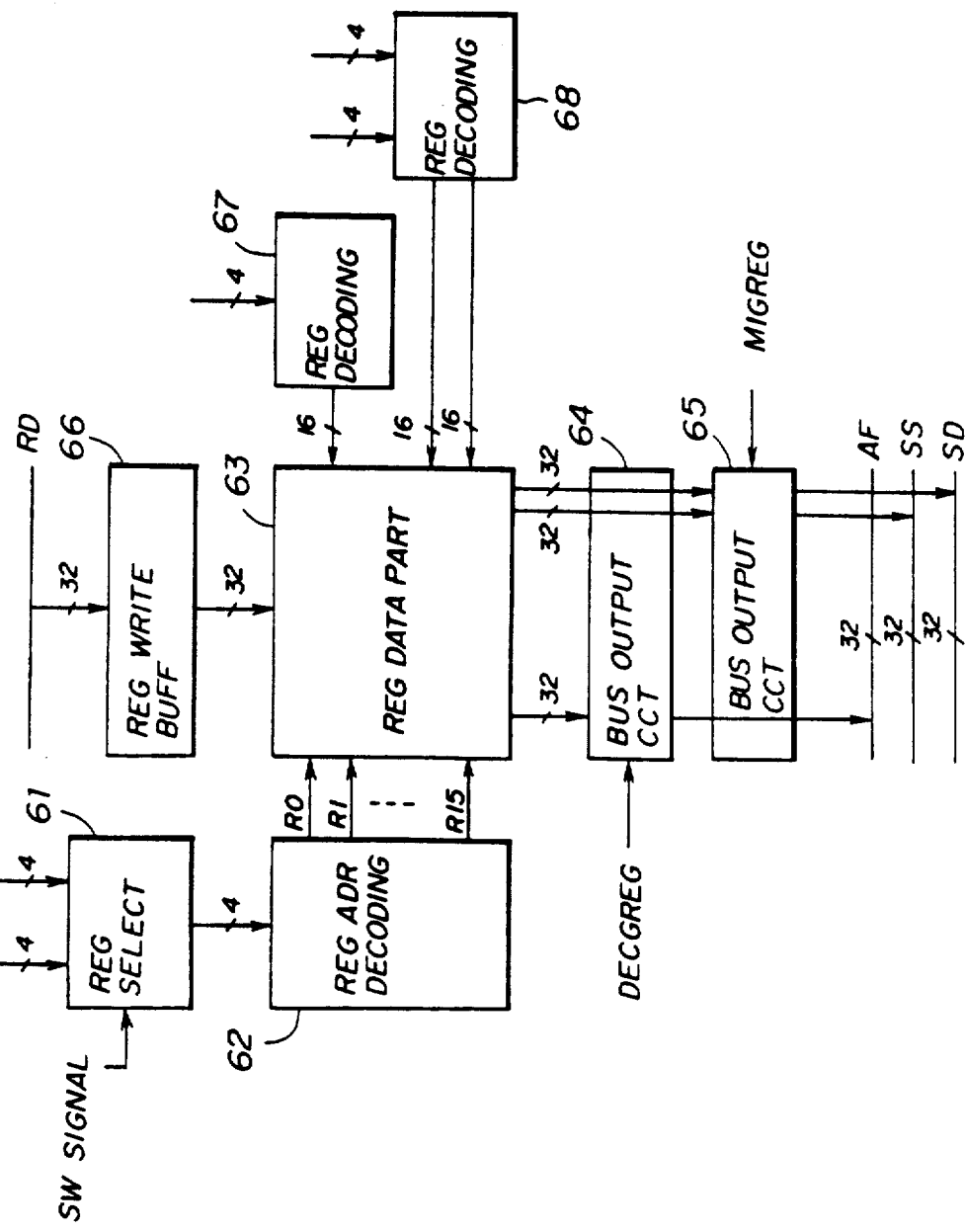
FIG. 6 is a system block diagram showing an embodiment of a general purpose register part shown in FIG. 5.

FIG. 6 shows an embodiment of the general purpose register part 4 shown in FIG. 5. The general purpose register part 4 shown in FIG. 6 includes a register selection circuit 61 for address calculation, a register address decoding circuit 62 for address calculation, a register data part 63, a bus output circuit 64 for address calculation, a bus output circuit 65 for operation, a register write buffer 66, a register decoding circuit 67 for writing, and a register decoding circuit 68 for operation which are coupled as shown.

Figure 7:
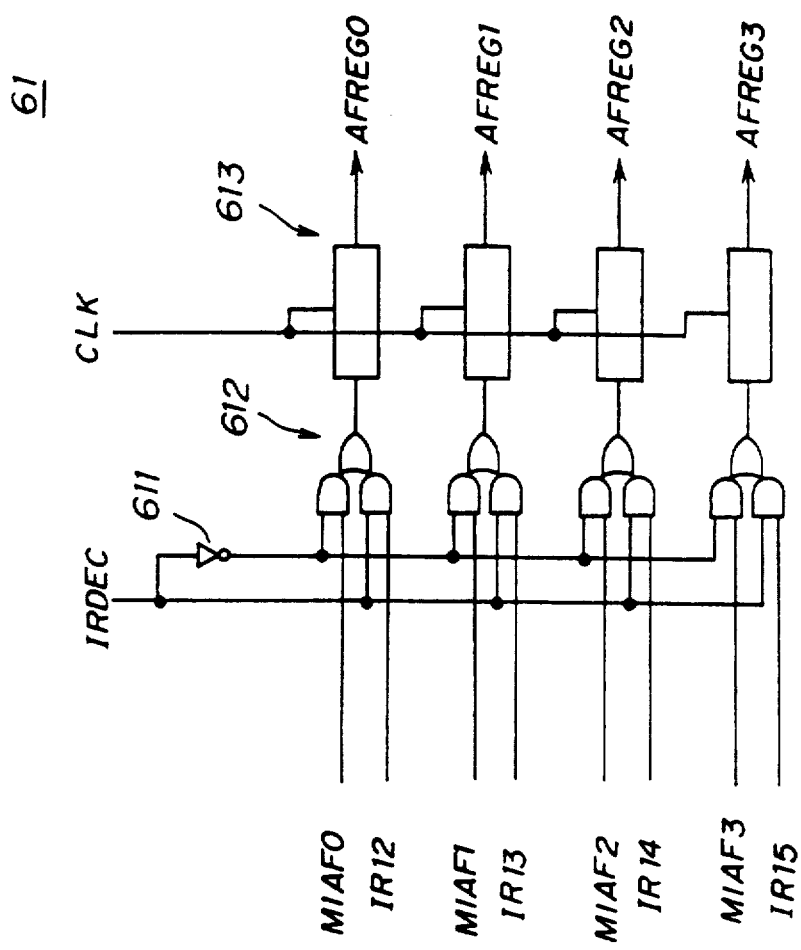
FIG. 7 is a circuit diagram showing an essential part of an embodiment of a register selection circuit shown in FIG. 6.

FIG. 7 shows an essential part of an embodiment of the register selection circuit 61 shown in FIG. 6. The register selection circuit 61 includes an inverter 611 which receives a switching signal IRDEC, a gate group 612 and a latch circuit group 613 which are connected as shown. The switching signal IRDEC switches the mode between an instruction decode mode and a microinstruction execution mode. The gate group 612 receives microinstructions MIAF0 through MIAF3, processor status word signals IR12 through IR15, the switching signal IRDEC and an inverted switching signal $\overline{\text{IRDEC}}$. The latch circuit group 613 receives outputs of the gate group 612 and outputs register selection signals AFREG0 through AFREG3 in response to a clock signal CLK.

Figure 8:
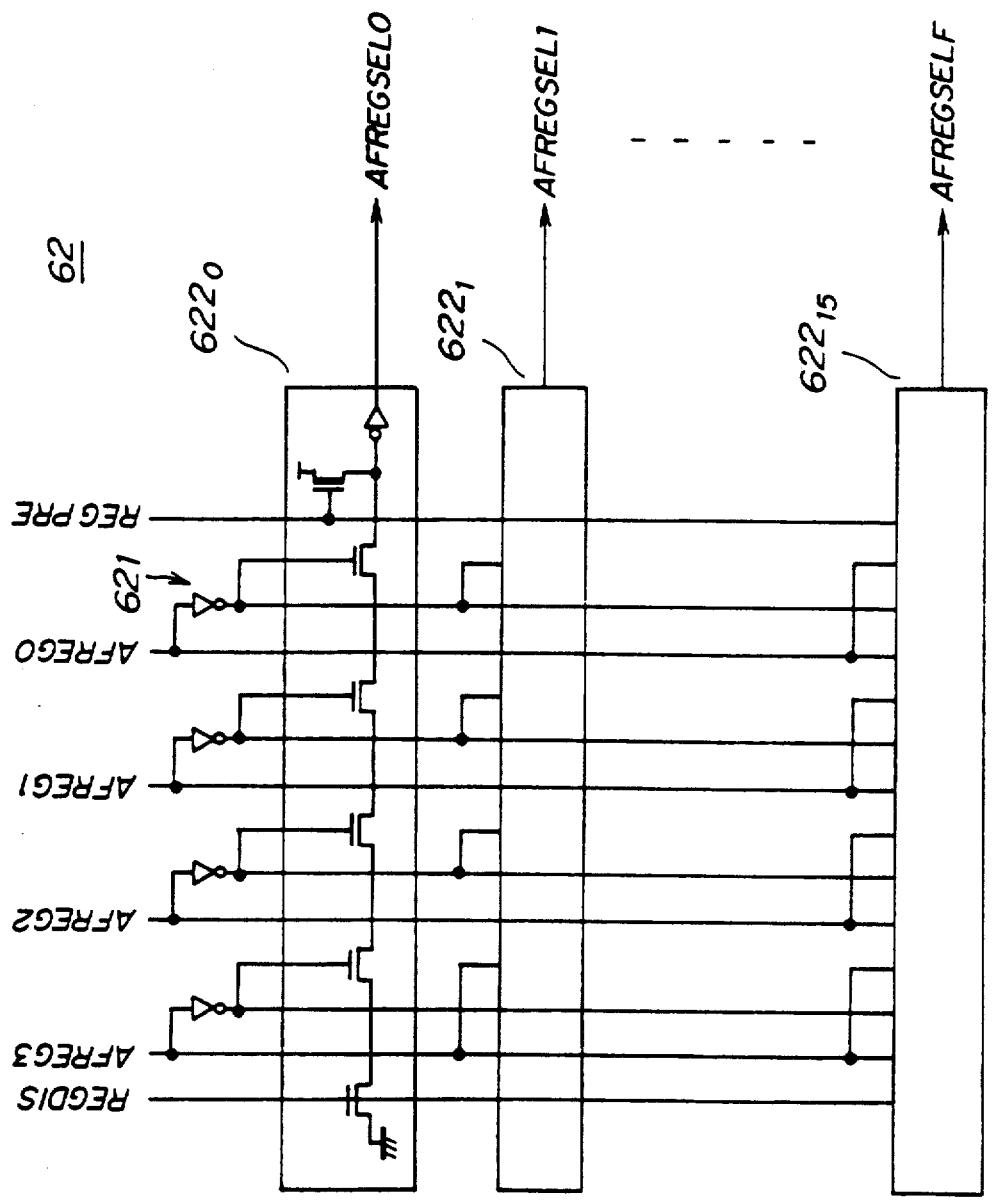
FIG. 8 is a circuit diagram showing an essential part of an embodiment of a register address decoding circuit shown in FIG. 6.

FIG. 8 shows an essential part of an embodiment of the register address decoding circuit 62 shown in FIG. 6. The register address decoding circuit 62 includes an inverter group 621 and decoding circuits $622_0$ through $622_{15}$ having identical circuit structure. Only the circuit structure of the decoding circuit $622_0$ is shown for the sake of convenience. The decoding circuits $622_0$ through $622_{15}$ respectively output selection signals AFREGSEL0 through AFREGSELF in response to the register selection signals AFREG0 through AFREG3 from the register selection circuit 61 and clock signals REGPRE and REGDIS.

Figure 9:
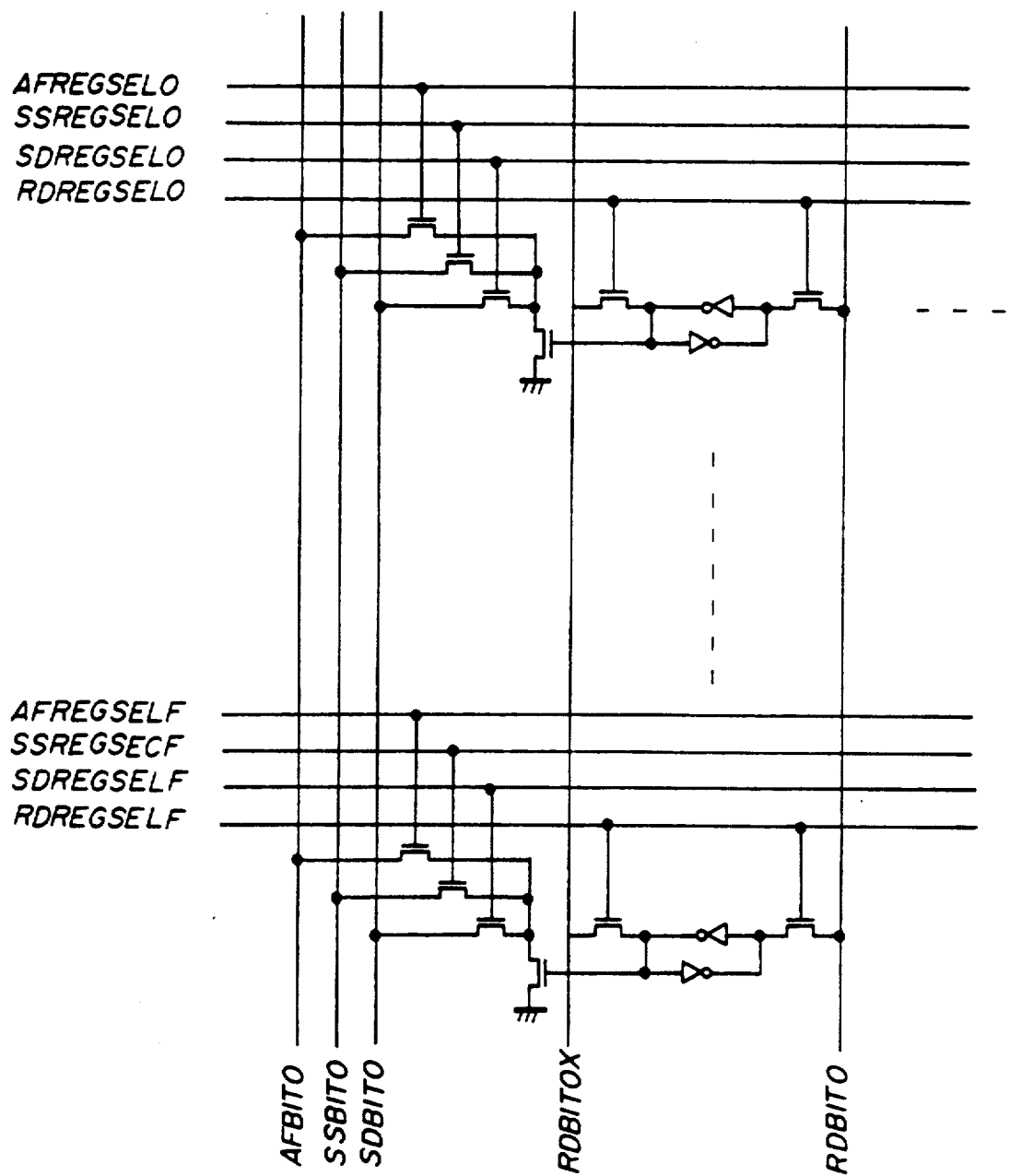
FIG. 9 is a circuit diagram showing an essential part of an embodiment of a register data part shown in FIG. 6.

FIG. 9 shows an essential part of an embodiment of the register data part 63 shown in FIG. 6. In FIG. 9, the register data part 63 includes transistors and inverters which are connected as shown for storing data. Signals RDBIT0 and RDBIT0X are obtained from a bus RD via the register write buffer 66. A signal AFBIT0 is supplied to the bus output circuit 64, and signals SSBIT0 and SDBIT0 are supplied to the bus output circuit 65. Signals RDREGSEL0 and RDREGSELF are obtained from the register decoding circuit 67, and signals SSREGSEL0 and SSREGSELF and signals SDREGSEL0 and SDREGSELF are obtained from the register decoding circuit 68.

Figure 10:
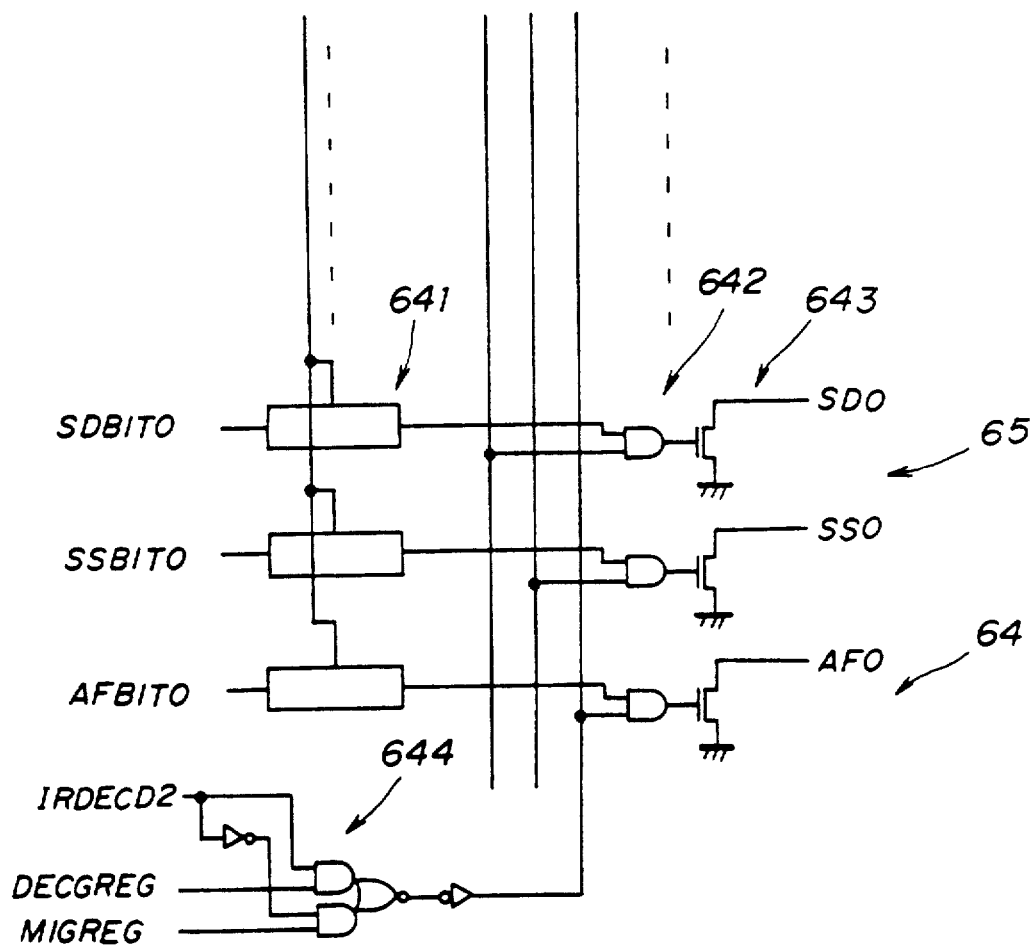
FIG. 10 is a circuit diagram showing an essential part of an embodiment of a bus output circuit shown in FIG. 6.

FIG. 10 shows an essential part of an embodiment of the bus output circuits 64 and 65. The circuit part shown in FIG. 10 includes a latch circuit group 641, a AND gate group 642, a transistor group 643, and a gate circuit part 644. The gate circuit part 644 receives the switching signal IRDECD2 for switching the mode between the instruction decode mode and the microinstruction execution mode, a signal MIGREG for controlling the bus output, and an enable signal DECGREG for enabling the instruction decode and read out from the register data part 63. Output signals SD0, SS0 and AF0 are respectively output on the buses SD, SS and AF.

Figure 11:
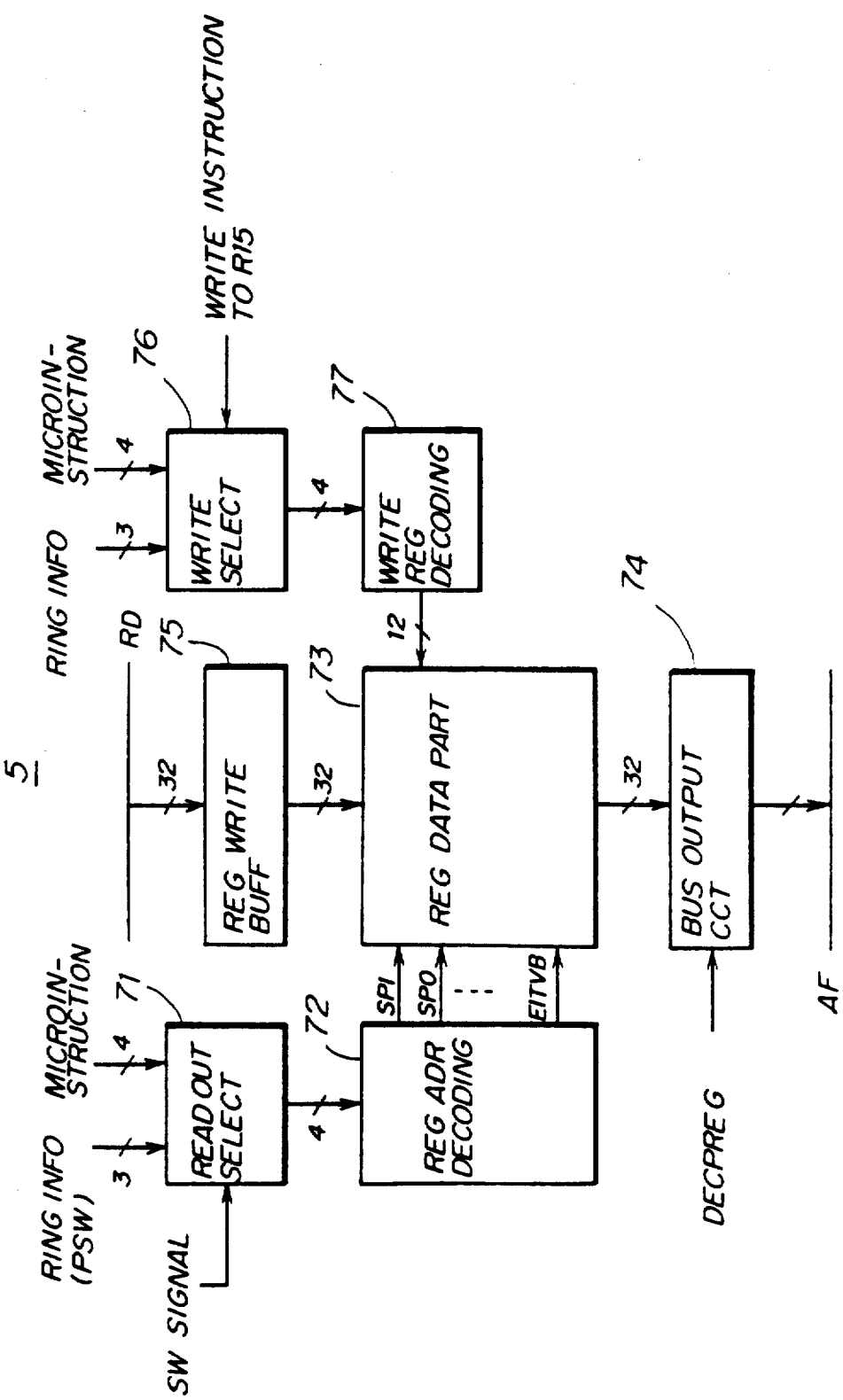
FIG. 11 system block diagram showing an embodiment of a special purpose register part shown in FIG. 5.

FIG. 11 shows an embodiment of the special purpose register part 5 shown in FIG. 5. The special purpose register part 5 shown in FIG. 11 includes a read out selection circuit 71, a register address decoding circuit 72, a special purpose register data part 73, a bus output circuit 74, a register write buffer 75, a write selection circuit 76, and a write register decoding circuit 77 which are coupled as shown.

Figure 12:
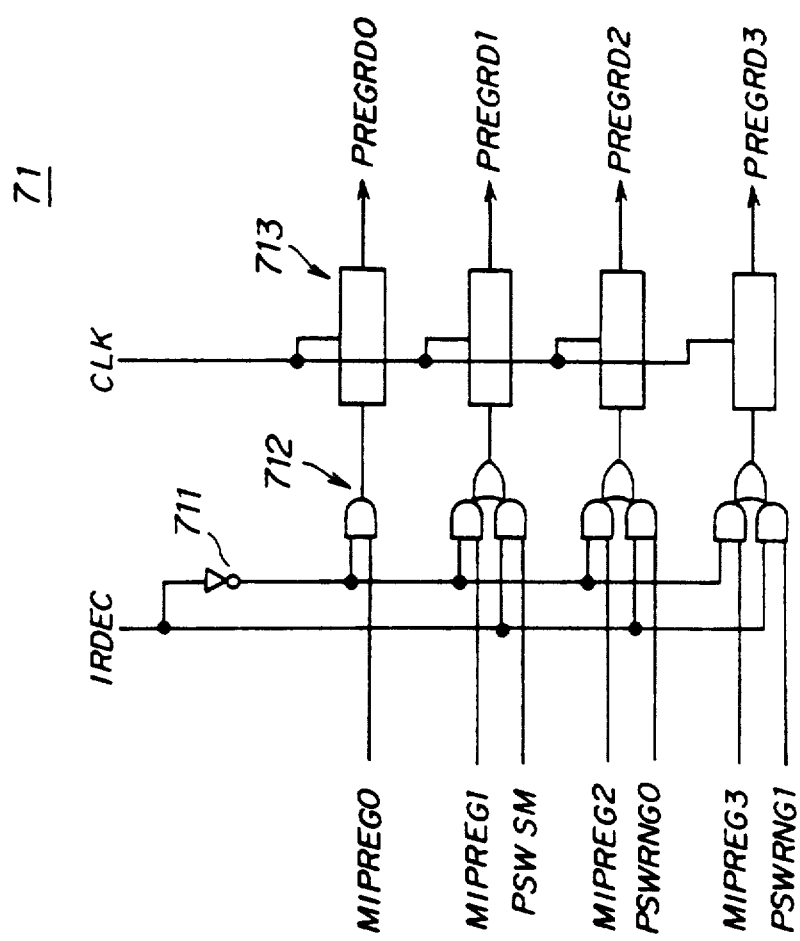
FIG. 12 is a circuit diagram showing an essential part of an embodiment of a register read out selection circuit shown in FIG. 11.

FIG. 12 shows an essential part of an embodiment of the read out selection circuit 71 shown in FIG. 11. The read out selection circuit 71 includes an inverter 711 which receives the switching signal IRDEC, a gate group 712 and a latch circuit group 713 which are connected as shown. The gate group 712 receives microinstructions MIPREG0 through MIPREG3, ring level signals PSWSM, PSWRNG0 and PSWRNG1 received from the processor status word register 15 shown in FIG. 5, the switching signal IRDEC and an inverted switching signal $\overline{\text{IRDEC}}$. The latch circuit group 613 receives outputs of the gate group 612 and outputs register selection signals PREGRD0 through PREGRD3 in response to the clock signal CLK.

Figure 13:
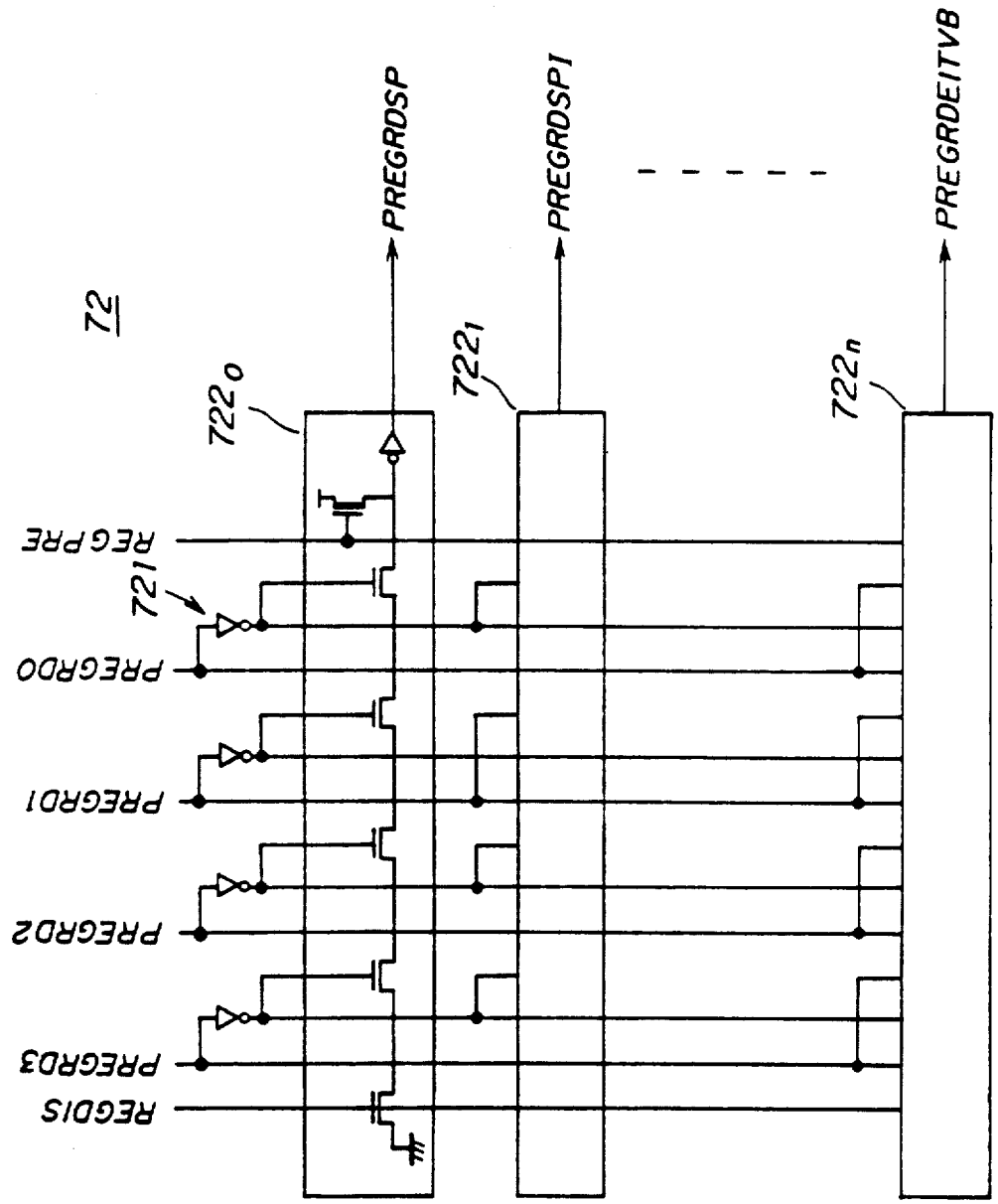
FIG. 13 is a circuit diagram showing an essential part of an embodiment of a register address decoding circuit shown in FIG. 11.

FIG. 13 shows an essential part of an embodiment of the register address decoding circuit 72 shown in FIG. 11. The register address decoding circuit 72 includes an inverter group 721 and decoding circuits $722_0$ through $722_n$ having identical circuit structure. Only the circuit structure of the decoding circuit $722_0$ is shown for the sake of convenience. The decoding circuits $722_1$, $722_2$ and $722_n$ respectively output selection signals PREGRDSP, PREGRDSPI and PREGRDEITVB in response to the register selection signals PREGRD0 through PREGRD3 from the register selection circuit 71 and the clock signals REGPRE and REGDIS. The circuit structure of the register address decoding circuit 72 is basically the same as that of the register address decoding circuit 62 shown in FIG. 6.

Figure 14:
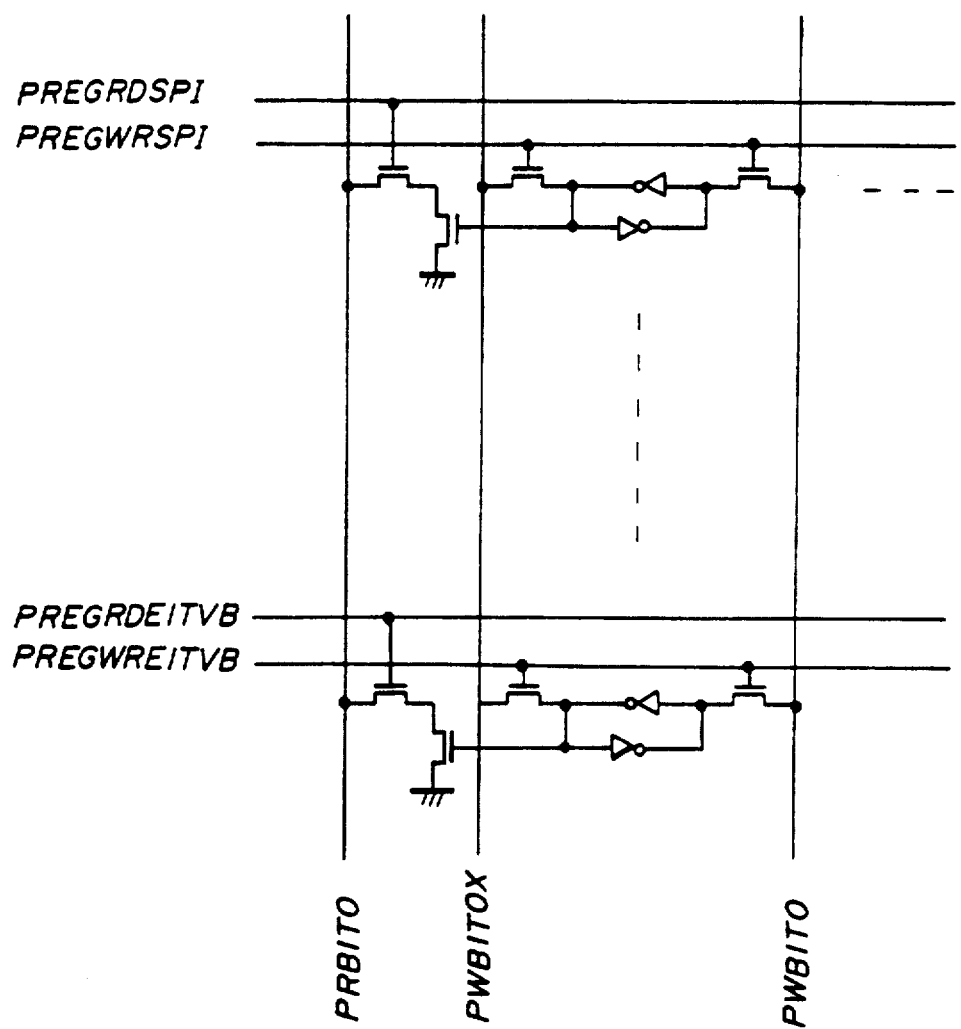
FIG. 14 is a circuit diagram showing an essential part of an embodiment of a register data part shown in FIG. 11.

FIG. 14 shows an essential part of an embodiment of the special purpose register data part 73 shown in FIG. 11. The selection signals PREGRDSPI and PREGRDEITVB are obtained from the register address decoding circuit 72, and signals PREGWRSPI and PREGWREITVB are obtained from the write register decoding circuit 77. Signals PWBIT0 and PWBIT0X are obtained from the register write buffer 75, and a signal PRBIT0 is supplied to the bus output circuit 74. The circuit structure of the special purpose register data part 73 is similar to that of the general purpose register data part 63 shown in FIG. 9.

Figure 15:
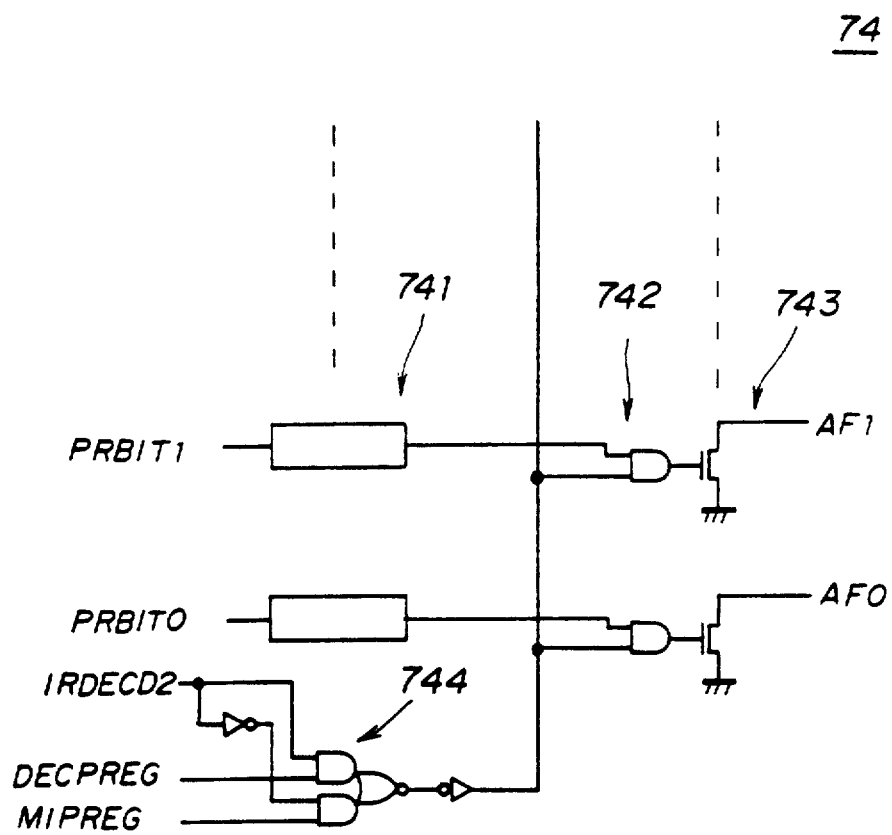
FIG. 15 is a circuit diagram showing an essential part of an embodiment of a bus output circuit shown in FIG. 11.

FIG. 15 shows an essential part of an embodiment of the bus output circuit 74. The circuit structure of the bus output circuit 74 is similar to that of the circuit part shown in FIG. 10. In FIG. 15, the bus output circuit 74 includes a latch circuit group 741, a AND gate group 742, a transistor group 743, and a gate circuit part 744. The gate circuit part 644 receives the switching signal IRDECD2 for switching the mode between the instruction decode mode and the microinstruction execution mode, a signal MIPREG for controlling the bus output, and an enable signal DECPREG for enabling the instruction decode and read out from the register data part 73. Output signals AF0 and AF1 are output on the bus AF.

Further, the present invention is not limited to these embodiments, but various variations and modifications may be made without departing from the scope of the present invention.

What is claimed is:

1. An information processing apparatus comprising:
   a decoder for decoding an instruction to produce a decoded result;
   a general purpose register part including a stack pointer and a plurality of general purpose registers;
   a special purpose register part including a plurality of special purpose registers; and
   processing means coupled to said decoder, said general purpose register part and said special purpose register part for carrying out a predetermined process based on the decoded result of said decoder, a read out operation of said general purpose register part and a read out operation of said special purpose register part being carried out in parallel with the decoding by said decoder, and the instruction decoded by said decoder indicating one of said general purpose register part and said special purpose register part having the read out result to be used by said processing means.

2. The information processing apparatus as claimed in claim 1, wherein said processing means includes a memory and an address calculation part for calculating an address based on which an access is made to said memory.

3. The information processing apparatus as claimed in claim 1, which further comprises an instruction register for temporarily storing the instruction, said decoder decoding the instruction which is read out from said instruction register.

4. The information processing apparatus as claimed in claim 1, wherein said decoder outputs a register specifying signal based on the decoded result, said processing means selecting one of the read out result of one of said general purpose register part and said special purpose register part in response to said register specifying signal.

5. The information processing apparatus as claimed in claim 1, wherein said special purpose register part includes a plurality of stack pointers, an arbitrary one of said stack pointers of said special purpose register part having a content identical to that of the stack pointer of said general purpose register part.

6. The information processing apparatus as claimed in claim 1, wherein said special purpose register part includes a plurality of stack pointers containing ring level information.

7. The information processing apparatus as claimed in claim 6, wherein said special purpose register part further includes a stack pointer containing interrupt process information.

8. The information processing apparatus as claimed in claim 1, wherein said processing means includes a memory, an address calculation part for calculating an address based on which an access is made to said memory and an arithmetic logic unit for carrying out the predetermined process on data read out from the address of said memory calculated by said address calculation part.

9. A monolithic information processing apparatus formed on a single semiconductor body comprising:
   a decoder for decoding an instruction to produce a decoded result;
   a general purpose register part including a stack pointer and a plurality of general purpose registers;
   a special purpose register part including a plurality of special purpose registers; and
   processing means coupled to said decoder, said general purpose register part and said special purpose register part for carrying out a predetermined process based on the decoded result of said decoder, a read out operation of said general purpose register part and a read out operation of said special purpose register part being carried out in parallel with the decoding by said decoder, the instruction decoded by said decoder indicating one of said general purpose register part and said special purpose register part having the read out result to be used by said processing means.

10. The information processing apparatus as claimed in claim 1,
    wherein said general and special purpose register parts provide an output, and
    further comprising means for selecting one of the outputs of said general purpose register part and said special purpose register part in dependence upon the decoded result from said decoder.

11. The information processing apparatus as claimed in claim 9,
    wherein said general and special purpose register parts provide an output, and
    further comprising means for selecting one of the outputs of said general purpose register part and said special purpose register part in dependence upon the decoded result from said decoder.

12. A microprocessor, comprising:
    an instruction decoder for decoding an instruction having a register field to produce an output;
    a first register designated by the register field in the instruction;
    a second register designated by the output of said instruction decoder; and
    processing means, operatively connected to said instruction decoder and said first and second registers, for reading said first and second registers in parallel with the decoding by said instruction decoder, and for processing contents read from of one of said first and second registers in accordance with the output of said instruction decoder.

13. A microprocessor, comprising:

an instruction decoder for decoding an instruction to produce an output;

processing means, operatively connected to said instruction decoder, for processing data in accordance with the output of said instruction decoder, said processing means operating according to predetermined ring levels;

a first register set including a first stack pointer having an output, accessible by a read out operation, and operatively connected to said processing means;

a second register set including second stack pointers, accessible by a read out operation, each of said second stack pointers corresponding to one of the ring levels and having an output; and means for carrying out the read operations of said first and second register sets in parallel with the decoding by said instruction decoder, for copying the output of one of said second stack pointers to said first stack pointer and for selecting the output from one of said first and second stack pointers in dependence upon the output of said instruction decoder.

* * * * *

UNITED STATES PATENT AND TRADEMARK OFFICE
CERTIFICATE OF CORRECTION

PATENT NO. : 5,274,792
DATED : Dec. 28, 1993
INVENTOR(S) : SATO

It is certified that error appears in the above-indentified patent and that said Letters Patent is hereby corrected as shown below:

Col. 2, line 45, after "showing" insert --an--.

Col. 3, line 1, after "FIG. 11" insert --is a--.

Signed and Sealed this

Nineteenth Day of July, 1994

Attest:

BRUCE LEHMAN

*Attesting Officer*     *Commissioner of Patents and Trademarks*